(12) United States Patent
Liu

(10) Patent No.: US 12,003,405 B2
(45) Date of Patent: Jun. 4, 2024

(54) HIGH LATENCY LINK DETERMINING METHOD, ROUTING ADVERTISEMENT METHOD, AND APPARATUS

(71) Applicant: Huawei Technologies Co., Ltd., Shenzhen (CN)

(72) Inventor: Guoliang Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 17/716,872

(22) Filed: Apr. 8, 2022

(65) Prior Publication Data

US 2022/0231937 A1 Jul. 21, 2022

Related U.S. Application Data

(63) Continuation of application No. PCT/CN2020/120440, filed on Oct. 12, 2020.

(30) Foreign Application Priority Data

Oct. 12, 2019 (CN) .......................... 201910969921.1

(51) Int. Cl.
*H04L 45/121* (2022.01)
*H04L 45/12* (2022.01)
*H04L 12/46* (2006.01)

(52) U.S. Cl.
CPC .......... *H04L 45/121* (2013.01); *H04L 45/123* (2013.01); *H04L 12/4641* (2013.01)

(58) Field of Classification Search
CPC . H04L 45/121; H04L 45/123; H04L 12/4641; H04L 45/124; H04L 45/125;
(Continued)

(56) References Cited

U.S. PATENT DOCUMENTS 9,178,805 B2   11/2015   Goel
2008/0117829 A1*  5/2008   Nakano ............... H04L 43/0858
                                                          370/247
(Continued)

FOREIGN PATENT DOCUMENTS

CN      101039277 A      9/2007
CN      101159669 A      4/2008
(Continued)

OTHER PUBLICATIONS

"Juniper Networks EVPN Implementation for Next-Generation Data Center Architectures, Using Ethernet VPN to Address Evolving Data Center Requirements," White Paper, XP055367919, Total 62 pages, (Jul. 31, 2015).
(Continued)

*Primary Examiner* — Rina C Pancholi
(74) *Attorney, Agent, or Firm* — Leydig, Voit & Mayer, Ltd.

(57) ABSTRACT

A first provider edge (PE) determines whether a link between the first PE and a second PE is a high latency link, where the second PE is a next hop of the first PE. When determining an actual latency corresponding to the link, the first PE compares the actual latency with a first latency threshold. When the actual latency is greater than or equal to the first latency threshold, it indicates that the actual latency exceeds a latency upper limit corresponding to the link, the first PE determines that the link is a high latency link. In this way, it is not necessary to wait for network management personnel to determine whether the link is a high latency link. After determining the actual latency corresponding to the link, the first PE can determine in time whether the link is a high latency link.

20 Claims, 3 Drawing Sheets

---

S101

A first PE determines an actual latency corresponding to a link between the first PE and a second PE

S102

When the actual latency is greater than or equal to a first latency threshold, the first PE determines that the link between the first PE and the second PE is a high latency link

(58) Field of Classification Search
CPC ..... H04L 45/24; H04L 45/66; H04L 41/0894; H04L 41/122; H04L 41/5025; H04L 43/06; H04L 43/0894; H04L 43/0852; H04L 43/16; H04L 45/70

See application file for complete search history.

(56) References Cited

U.S. PATENT DOCUMENTS

| | | | |
|---|---|---|---|
| 2010/0061264 A1* | 3/2010 | Campbell | H04L 45/122 370/253 |
| 2011/0225311 A1* | 9/2011 | Liu | H04L 45/125 709/231 |
| 2011/0225312 A1 | 9/2011 | Liu et al. | |
| 2012/0163180 A1* | 6/2012 | Goel | H04L 45/306 370/238 |
| 2018/0006995 A1* | 1/2018 | Bickhart | H04L 45/66 |
| 2018/0287990 A1* | 10/2018 | Bickhart | H04L 45/02 |
| 2018/0359178 A1 | 12/2018 | Brissette et al. | |
| 2019/0158371 A1* | 5/2019 | Dillon | H04L 47/196 |
| 2019/0238450 A1 | 8/2019 | Michael et al. | |
| 2019/0305988 A1* | 10/2019 | Bickhart | H04L 12/4633 |
| 2020/0296012 A1* | 9/2020 | Paruchuri | H04L 43/0811 |
| 2021/0211387 A1* | 7/2021 | Li | H04L 43/0829 |

FOREIGN PATENT DOCUMENTS

| | | |
|---|---|---|
| CN | 101247288 A | 8/2008 |
| CN | 101567841 A | 10/2009 |
| CN | 102263699 A | 11/2011 |
| CN | 105591960 A | 5/2016 |
| CN | 106656807 A | 5/2017 |
| CN | 106713141 A | 5/2017 |
| EP | 3018866 A1 | 5/2016 |
| EP | 3547624 A1 | 10/2019 |

OTHER PUBLICATIONS

L. Zheng et al., "A Framework for E-VPN Performance Monitoring draft-zheng-l2vpn-evpn-pm-framework-01," Network Working Group, Internet-Draft, Total 9 pages (Feb. 13, 2014).

Salam et al., "EVPN Operations, Administration and Maintenance Requirements and Framework draft-ietf-bess-evpn-pam-req-frmwk-01," Internet-Draft, Intended Status: Informational, Total 22 pages (Jul. 8, 2019).

B. Wen et al., "A Yang Data Model for Layer 2 Virtual Private Network (L2VPN) Service Delivery," Internet Engineering Task Force (IETF), Request for Comments: 8466, Total 158 pages (Oct. 2018).

N. Malhotra et al., "Weighted Multi-Path Procedures for EVPN All-Active Multi-Homing draft-ietf-bess-evpn-unequal-lb-02," BESS Working Group, Internet-Draft, Intended Status: Proposed Standard, Total 22 pages (Jul. 22, 2019).

"Series Y: Global Information Infrastructure, Internet Protocol Aspects and Next-Generation Networks, Internet protocol aspects—Operation, administration and maintenance, OAM functions and mechanisms for Ethernet based networks," ITU-T Recommendation Y.1731, ITU-T Telecommunication Standardization Sector of ITU, Total 80 pages, International Telecommunication Union, Geneva, Switzerland (May 2006).

* cited by examiner

HIGH LATENCY LINK DETERMINING METHOD, ROUTING ADVERTISEMENT METHOD, AND APPARATUS

CROSS-REFERENCE TO RELATED APPLICATIONS

This application is a continuation application of International Patent Application No. PCT/CN2020/120440, filed on Oct. 12, 2020, which claims priority to Chinese Patent Application No. 201910969921.1, filed on Oct. 12, 2019. The disclosures of the aforementioned applications are hereby incorporated by reference in their entireties.

TECHNICAL FIELD

Embodiments of this application relate to the communications field, and in particular, to a high latency link determining method, a routing advertisement method, and an apparatus.

BACKGROUND

Currently, a virtual private network (VPN) may be deployed on a provider edge (PE) device. The VPN may include an Ethernet virtual private network (EVPN). A plurality of EVPN instances may be deployed on the PE device. In this way, a provider can provide an EVPN access service for a plurality of customers on one PE device. Data between these customers is fully isolated. The EVPN instance can process a service for a customer edge (CE) device. To improve service processing efficiency, one EVPN instance may correspond to a plurality of links. The plurality of links may be all used to transmit corresponding service data.

It may be understood that a link latency may reflect data transmission efficiency on a link. If the link latency is relatively high, it indicates that the data transmission efficiency on the link is relatively low, and service processing efficiency on the link is also relatively low. Therefore, it is very important to determine a link with a relatively high latency in time and correspondingly adjust a load balancing policy adaptively.

However, the link with the relatively high latency cannot be determined in a conventional manner in time. Therefore, it is urgent to provide a solution to resolve the problem.

SUMMARY

Embodiments of this application provide a high latency link determining method, a routing advertisement method, and an apparatus, to determine a link with a relatively high latency in time.

According to a first aspect, an embodiment of this application provides a high latency link determining method. Specifically, a first PE device may determine whether a link between the first PE device and a second PE device is a high latency link. The second PE device is a next hop of the first PE device. Specifically, when sending a routing message to the first PE device, a network device may add a first latency threshold to the corresponding routing message. The first latency threshold is used to indicate a latency upper limit corresponding to the foregoing link. In other words, the first PE device may obtain the first latency threshold from the received routing message, that is, obtain a determining reference for determining whether the link is a high latency link. When the first PE device determines whether the link between the first PE device and the second PE device is a high latency link, after the first PE device determines an actual latency corresponding to the link between the first PE device and the second PE device, the first PE device may compare the actual latency with the first latency threshold, to determine whether the link is a high latency link. When the actual latency is greater than or equal to the first latency threshold, it indicates that the actual latency exceeds the latency upper limit corresponding to the link between the first PE device and the second PE device. Therefore, the first PE device may determine that the link is a high latency link. It can be learned that in comparison with the conventional technology, according to the solution in this embodiment of this application, it is not necessary to wait for network management personnel to determine whether the link between the first PE device and the second PE device is a high latency link. After determining the actual latency corresponding to the link between the first PE device and the second PE device, the first PE device can determine in time whether the link between the first PE device and the second PE device is a high latency link.

In an implementation, in actual application, for an EVPN, advertisement of a routing message generally corresponds to an EVPN instance. In consideration of this, in an implementation of this embodiment of this application, the routing message may be an Ethernet virtual instance auto discovery (EVI-AD) routing message. In other words, the first PE device may obtain the first latency threshold from the received EVI-AD routing message, to determine based on the first latency threshold whether the link between the first PE device and the second PE device is a high latency link.

In an implementation, in actual application, the EVPN instance may be related to a specific service, that is, different EVPN instances correspond to different service types; and different services have different latency requirements for data transmission. In consideration of this, the EVI-AD routing message may further carry an identifier of the EVPN instance. The identifier of the EVPN instance is used to identify the EVPN instance. Correspondingly, the link between the first PE device and the second PE device corresponds to the EVPN instance.

In an implementation, in actual application, a link latency is an important indicator for indicating data transmission efficiency on a link. In consideration of this, to further evaluate the data transmission efficiency on the link, in an implementation of this embodiment of this application, the routing message sent by the network device to the first PE device may further carry a second latency threshold. The second latency threshold is used to indicate a latency lower limit corresponding to the link between the first and second PE devices. The first PE device may further evaluate data transmission efficiency on the link between the first PE device and the second PE device based on the second latency threshold.

In an implementation, to improve accuracy of a high latency link determining result of the first PE, the first PE device may continuously determine a plurality of actual latencies, for example, a first quantity of actual latencies. When the plurality of actual latencies are all greater than or equal to the first latency threshold, the first PE device determines that the link between the first PE device and the second PE device is a high latency link.

In an implementation, the first PE device determines that the first link (that is, the link between the first PE device and the second PE device) is a high latency link, and then, the first PE device may further automatically adjust a load balancing policy. Specifically, the first PE device may further send first data to a first CE device through a second link. The first data is data that is expected to be sent to the first CE device through the first link. The second link and the first link are load sharing links for each other. The second link is a link between the first PE device and a third PE device. In other words, after determining that the first link is a high latency link, the first PE device may start a new load balancing policy, switch, to the second link, the first data that is expected to be sent to the first CE device through the first link, and send the first data to the first CE device, to improve efficiency of sending data to the first CE device.

In an implementation, if there is only one second link serving as the load sharing link for the first link, the first PE device may adjust the first data to the second link and send the first data to the first CE device.

In an implementation, if there are a plurality of second links serving as the load sharing links for the first link, to further improve efficiency of sending data from the first PE device to the first CE device, the first PE device may further adjust the first data to the plurality of second links with reference to bandwidths of the plurality of second links and send the first data to the first CE device. Specifically, the first PE device may obtain the bandwidth corresponding to each of the plurality of second links. Then, the first PE device determines, based on the bandwidth corresponding to each second link, a data traffic adjustment proportion corresponding to each second link, and sends the first data to the first CE device through the plurality of second links based on the data traffic adjustment proportion corresponding to each second link.

In an implementation, in actual application, if the second link is a high latency link, efficiency of adjusting the first data to the second link and sending the first data to the first CE device may not be effectively improved. In consideration of this, to ensure the efficiency of adjusting the first data to the second link and sending the first data to the first CE device, the second link may be a non-high latency link.

In an implementation, if the first PE device determines the latency lower limit corresponding to the first link, the first PE device may further compare the actual latency on the first link with the second latency threshold. When the actual latency is less than or equal to the second latency threshold, it indicates that the actual latency on the first link is lower than the latency lower limit corresponding to the first link. In this case, the first PE device may determine that the first link is a low latency link, that is, may determine that data transmission efficiency on the first link is high.

In an implementation, the first PE device may continuously determine a plurality of actual latencies, for example, a first quantity of actual latencies, and determine that the first link is a low latency link when the plurality of actual latencies are all less than or equal to the second latency threshold. Therefore, the following problem is avoided: The actual latency is inaccurately determined in a single time, and therefore, the result of determining based on the actual latency in the single time whether the first link is a low latency link is inaccurate.

In an implementation, the first link is a low latency link. To some extent, it may indicate relatively high data transmission efficiency on the first link. In consideration of this, in this case, to improve efficiency of sending data to the first CE device, the first PE device may further adjust second data to the first link and send the second data to the first CE device. The second data is data that is expected to be sent to the first CE device through a third link. The third link and the first link are load sharing links for each other. In other words, after determining that the first link is a low latency link, the first PE device may start a new load balancing policy, switch, to the first link, the second data that is expected to be sent to the first CE device through the third link, and send the second data to the first CE device, to improve efficiency of sending data to the first CE device.

According to a second aspect, an embodiment of this application provides a routing advertisement method, including: A network device sends a routing message to a first provider edge PE device. The routing message includes a first latency threshold. The first latency threshold is used to indicate a latency upper limit corresponding to a link between the first PE device and a second PE device. The second PE device is a next hop of the first PE device. In this way, the first PE device may determine the first latency threshold based on the routing message, to determine based on the first latency threshold whether the link between the first PE device and the second PE device is a high latency link.

In an implementation, the routing message further includes a second latency threshold. The second latency threshold is used to indicate a latency lower limit corresponding to the link between the first PE device and the second PE device.

In an implementation, the routing message is an Ethernet virtual instance auto discovery EVI-AD routing message.

In an implementation, the EVI-AD routing message further includes an identifier of an Ethernet virtual private network EVPN instance. The link between the first PE and the second PE corresponds to the EVPN instance.

In an implementation, the EVI-AD routing message includes an extended community field. The extended community field includes the first latency threshold.

In an implementation, the EVI-AD routing message includes an extended community field. The extended community field includes the second latency threshold.

According to a third aspect, an embodiment of this application provides a high latency link determining apparatus, including a first determining unit and a second determining unit. The first determining unit is configured to determine an actual latency corresponding to a link between a first provider edge PE device and a second PE device. The second PE device is a next hop of the first PE device. The second determining unit is configured to: when the actual latency is greater than or equal to a first latency threshold, determine that the link between the first PE and the second PE is a high latency link. The first latency threshold is used to indicate a latency upper limit corresponding to the link between the first PE and the second PE.

In an implementation, the first latency threshold is obtained from a received Ethernet virtual instance auto discovery EVI-AD routing message.

In an implementation, the EVI-AD routing message further includes an identifier of an Ethernet virtual private network EVPN instance. The link between the first PE device and the second PE device corresponds to the EVPN instance.

In an implementation, the EVI-AD routing message further includes a second latency threshold. The second latency threshold is used to indicate a latency lower limit corresponding to the link between the first PE device and the second PE device.

In an implementation, the second determining unit is specifically configured to: when a plurality of actual latencies continuously determined by the first PE device are all greater than or equal to the first latency threshold, determine that the link between the first PE device and the second PE device is a high latency link.

In an implementation, the apparatus further includes a first sending unit, configured to send first data to a first customer edge CE device through a second link. The first data is data that is expected to be sent to the first CE device through the first link. The second link and the first link are load sharing links for each other. The first link is the link between the first PE device and the second PE device.

In an implementation, the first sending unit is specifically configured to: obtain a bandwidth corresponding to each of a plurality of second links; determine, based on the bandwidth corresponding to each second link, a data traffic adjustment proportion corresponding to each second link; and send the first data to the first CE device through the plurality of second links based on the data traffic adjustment proportion corresponding to each second link.

In an implementation, the first sending unit is specifically configured to send the first data to the first CE device through one second link.

In an implementation, the second link is a non-high latency link.

In an implementation, the apparatus further includes a third determining unit, configured to: when the actual latency is less than or equal to the second latency threshold, determine that the link between the first PE device and the second PE device is a low latency link. The second latency threshold is used to indicate a latency lower limit corresponding to the link between the first PE device and the second PE device.

In an implementation, the third determining unit is specifically configured to: when a plurality of actual latencies continuously determined by the first PE device are all less than or equal to the second latency threshold, determine that the link between the first PE device and the second PE device is a low latency link.

In an implementation, the apparatus further includes a second sending unit, configured to send second data to a first CE device through the first link. The second data is data that is expected to be sent to the first CE device through a third link. The third link and the first link are load sharing links for each other. The first link is the link between the first PE device and the second PE device.

According to a fourth aspect, an embodiment of this application provides a routing advertisement apparatus, including a route sending unit configured to send a routing message to a first provider edge PE device. The routing message includes a first latency threshold. The first latency threshold is used to indicate a latency upper limit corresponding to a link between the first PE device and a second PE device. The second PE device is a next hop of the first PE device.

In an implementation, the routing message further includes a second latency threshold. The second latency threshold is used to indicate a latency lower limit corresponding to the link between the first PE device and the second PE device.

In an implementation, the routing message is an Ethernet virtual instance auto discovery EVI-AD routing message.

In an implementation, the EVI-AD routing message further includes an identifier of an Ethernet virtual private network EVPN instance. The link between the first PE device and the second PE device corresponds to the EVPN instance.

In an implementation, the EVI-AD routing message includes an extended community field. The extended community field includes the first latency threshold.

In an implementation, the EVI-AD routing message includes an extended community field. The extended community field includes the second latency threshold.

According to a fifth aspect, an embodiment of this application provides a network device, including a processor and a memory. The memory is configured to store a program. The processor is configured to execute the program in the memory, to perform the method according to any implementation of the first aspect or perform the method according to any implementation of the second aspect.

According to a sixth aspect, an embodiment of this application provides a computer-readable storage medium, including a program. When the program is run on a computer, the computer is enabled to perform the method according to any implementation of the first aspect or perform the method according to any implementation of the second aspect.

According to a seventh aspect, an embodiment of this application provides a computer program product including instructions. When the computer program product runs on a computer, the computer is enabled to perform the method according to any implementation of the first aspect or perform the method according to any implementation of the second aspect.

DESCRIPTION OF EMBODIMENTS

The embodiments of this application provide a high latency link determining method, to resolve a problem that a link with a relatively high latency cannot be determined in time by using the conventional technology.

Figure 1:
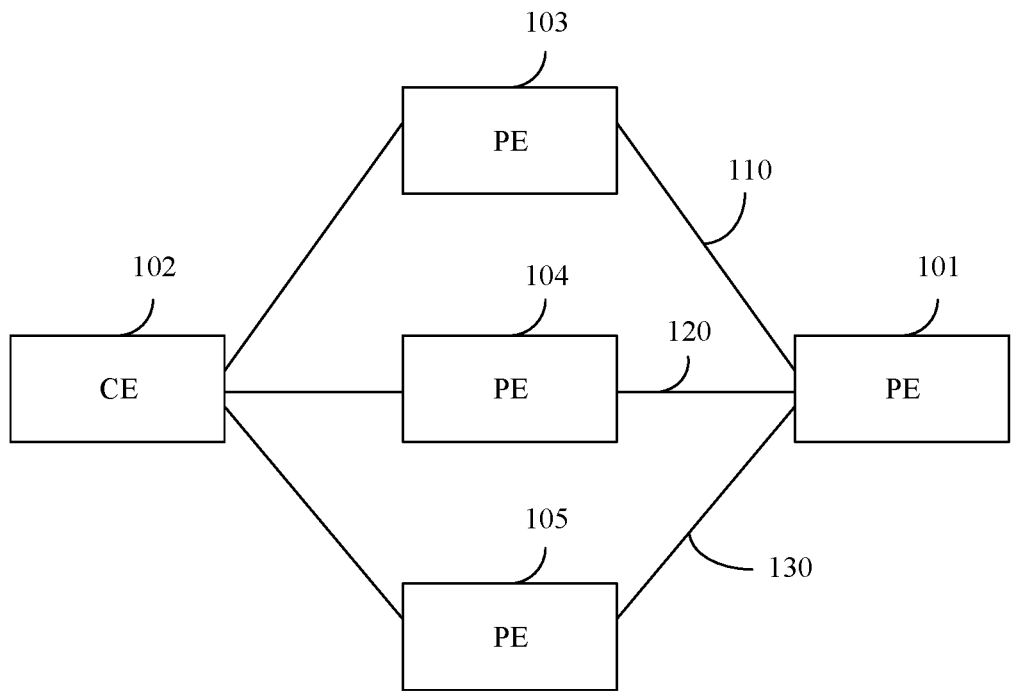
FIG. 1 is a schematic diagram of an example application scenario according to an embodiment of this application.

For ease of understanding, an application scenario in the embodiments of this application is first described. FIG. 1 is a schematic diagram of an example application scenario according to an embodiment of this application.

In the scenario shown in FIG. 1, there are a plurality of links between a PE 101 and a CE 102. In other words, the PE 101 may send data to the CE 102 through the plurality of links. The plurality of links are load balancing links for each other. As shown in FIG. 1, a link 110 between the PE 101 and a PE 103, a link 120 between the PE 101 and a PE 104, and a link 130 between the PE 101 and a PE 105 are load balancing links for one another. The PE 101 may send data to the CE 102 through the link 110. The PE 101 may alternatively send data to the CE 102 through the link 120. The PE 101 may alternatively send data to the CE 102 through the link 130.

It should be noted that FIG. 1 is merely shown for ease of understanding, and does not constitute a limitation on this embodiment of this application. In this embodiment of this application, the link between the PE 101 and the CE 102 is not limited to the three links shown in FIG. 1. A quantity of links between the PE 101 and the CE 102 may alternatively be another value. This is not enumerated herein. One or more other devices may be included between the CE 102 and the PE 103, between the CE 102 and the PE 104, between the CE 102 and the PE 105, between the PE 101 and the PE 103, between the PE 101 and the PE 104, and between the PE 101 and the PE 105.

It may be understood that a link latency may reflect data transmission efficiency on a link. If the link latency is relatively high, it indicates that the data transmission efficiency on the link is relatively low. Therefore, it is very important to determine in time whether the link is a high latency link. After whether the link is a high latency link is determined in time, a load balancing policy may be further adjusted to improve data transmission efficiency. However, whether the link is a high latency link cannot be determined in time in the conventional technology.

By using an example of determining whether the link 110 is a high latency link, the following describes a high latency link determining manner in the conventional technology.

In the conventional technology, the PE 101 may send an Ethernet loss measurement message (ETH-LMM) to the PE 103, and record a time of sending the ETH-LMM. After receiving the ETH-LMM sent by the PE 101, the PE 103 returns an Ethernet loss measurement reply (ETH-LMR) to the PE 101. The ETH-LMR carries a time of receiving the ETH-LMM by the PE 103. Then, the PE 101 calculates a latency on the link 110 between the PE 101 and the PE 103 based on the time of sending the ETH-LMM message and the time of receiving the ETH-LMM. After obtaining the latency on the link 110 through calculation, the PE 101 reports the latency to a server, for example, a network management system. Then, network management personnel manually analyze the latency, to determine whether the link 110 is a high latency link. It can be learned that in the conventional technology, the network management personnel determine whether the link 110 is a high latency link. Timeliness that the network management personnel determine, based on the latency reported by the PE 101, whether the link 110 is a high latency link is affected by many uncontrollable factors. For example, the network management personnel do not have enough analysis experience and cannot determine in time through analysis whether the link 110 is a high latency link. For another example, the network management personnel do not analyze the latency in time while processing another thing. Therefore, whether the link is a high latency link cannot be determined in time in the conventional technology.

In view of this, an embodiment of this application provides a high latency link determining method, to determine a high latency link in time. With reference to the accompanying drawings, the following describes the high latency link determining method provided in this embodiment of this application.

Figure 2:
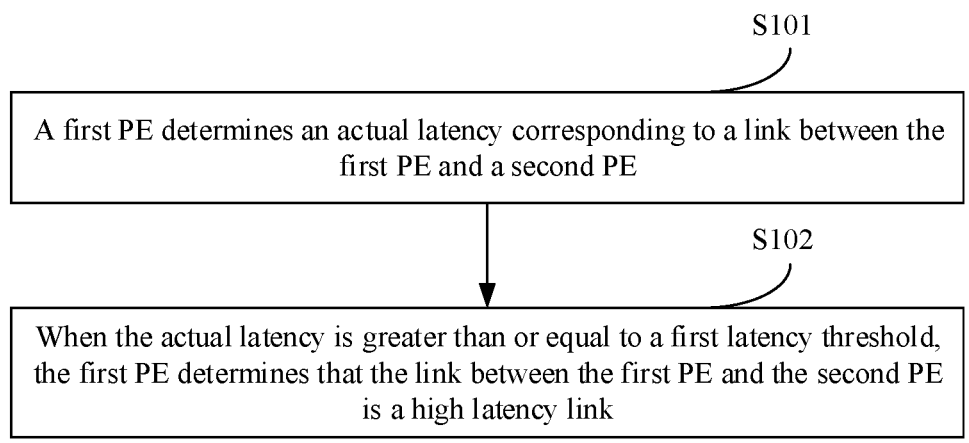
FIG. 2 is a flowchart of a high latency link determining method according to an embodiment of this application.

FIG. 2 is a schematic flowchart of a high latency link determining method according to an embodiment of this application.

The high latency link determining method shown in FIG. 2 may be implemented by performing, for example, the following block 101 and block 102.

Before a first PE performs the high latency link determining method shown in FIG. 2, the first PE may further perform a step of receiving a routing message from a network device to determine a first latency threshold. The following first describes this block.

Specifically, the network device may send the routing message to the first PE. The routing message carries the first latency threshold. The first latency threshold is used to indicate a latency upper limit corresponding to a link between the first PE and a second PE. The second PE is a next hop of the first PE.

It should be noted that the network device mentioned in this embodiment of this application may be a router, or may be a switch with a routing advertisement function. This is not specifically limited in this embodiment of this application. For example, the network device may be the PE 103, the PE 104, or the PE 105 shown in FIG. 1. Certainly, the network device may alternatively be another network node in a network. This is not specifically limited herein. The first PE mentioned in this embodiment of this application may be, for example, the PE 101 shown in FIG. 1. The second PE mentioned in this embodiment of this application may be, for example, the PE 103, the PE 104, or the PE 105 shown in FIG. 1.

In this embodiment of this application, in order that the first PE can determine in time whether the link between the first PE and the second PE is a high latency link, when sending the routing message to the first PE, the network device may add the first latency threshold to the routing message. For example, the network device may add the first latency threshold to an extended community attribute of the routing message. The first latency threshold is used to indicate the latency upper limit corresponding to the link between the first PE and the second PE. After receiving the routing message, the first PE may parse the routing message to obtain the first latency threshold. It may be understood that the first latency threshold may be considered as a determining reference for determining whether the link between the first PE and the second PE is a high latency link. Therefore, after determining the first latency threshold, the first PE may determine based on the first latency threshold whether the link between the first PE and the second PE is a high latency link.

The routing message is not specifically limited in this embodiment of this application. In actual application, for an EVPN, advertisement of a routing message generally corresponds to an EVPN instance. In consideration of this, in an implementation of this embodiment of this application, the routing message may be an Ethernet virtual instance auto discovery (EVI-AD) routing message. In other words, the first PE may obtain the first latency threshold from the received EVI-AD routing message.

It may be understood that, in actual application, the EVPN instance may be related to a specific service, that is, different EVPN instances correspond to different service types. Different services have different latency requirements for data transmission. Therefore, in this embodiment of this application, the EVI-AD routing message may further carry an identifier of the EVPN instance. The identifier of the EVPN instance is used to identify the EVPN instance. The link between the first PE device and the second PE device corresponds to the EVPN instance. Correspondingly, the first latency threshold is the latency upper limit corresponding to the link that is between the first PE and the second PE and that corresponds to the EVPN instance.

In this embodiment of this application, in actual application, the routing message sent by the network device to the first PE may pass through a plurality of other nodes. These nodes may perform corresponding processing on the routing message in a process of forwarding the routing message, for example, add another latency upper limit to the routing message. In other words, the routing message received by the first PE may include a plurality of latency upper limits. In this case, the first PE may determine one latency upper limit as the first latency threshold from the plurality of latency upper limits. For example, the first PE may determine a maximum value of the plurality of latency upper limits as the first latency threshold.

Then, the high latency link determining method performed by the first PE is described.

S101. The first PE determines an actual latency corresponding to the link between the first PE and the second PE.

S102. When the actual latency is greater than or equal to the first latency threshold, the first PE determines that the link between the first PE and the second PE is a high latency link.

In this embodiment of this application, the first PE may determine the actual latency corresponding to the link between the first PE and the second PE, and then compare the actual latency with the first latency threshold, to determine whether the link between the first PE and the second PE is a high latency link. This embodiment of this application does not specifically limit a specific implementation in which the first PE determines the actual latency. For example, the first PE may send an ETH-LMM to the second PE, and record a first time of sending the ETH-LMM message. After receiving the ETH-LMM sent by the first PE, the second PE feeds back an ETH-LMR to the first PE. The ETH-LMR carries a second time of receiving the ETH-LMM by the second PE. Then, the first PE may calculate a latency on the link between the first PE and the second PE based on the first time and the second time.

It may be understood that when the actual latency is greater than or equal to the first latency threshold, it indicates that the actual latency exceeds the latency upper limit corresponding to the link between the first PE and the second PE. Therefore, the first PE may determine that the link is a high latency link. On the contrary, when the actual latency is less than the first latency threshold, it indicates that the actual latency does not exceed the latency upper limit corresponding to the link between the first PE and the second PE. Therefore, the first PE may determine that the link between the first PE and the second PE is not a high latency link.

It can be learned from the foregoing description that, by using the solution provided in this embodiment of this application, the determining reference for determining whether the link is a high latency link is added to the routing message to be sent to the first PE. Therefore, after determining the actual latency corresponding to the link between the first PE and the second PE, the first PE may determine in time whether the link between the first PE and the second PE is a high latency link.

In this embodiment of this application, in actual application, the following problem may occur: A result of determining is inaccurate when the first PE determines the actual latency on the link between the first PE and the second PE. For example, due to an accidental network jitter, the determined actual latency is relatively high. Actually, the network is basically in a normal state. When the network is in the normal state, the actual latency on the link between the first PE and the second PE is not so high. In consideration of this, to improve accuracy of the result of determining obtained in block S102, in an implementation of this embodiment of this application, the first PE may continuously determine a plurality of actual latencies, for example, a first quantity of actual latencies. When the plurality of actual latencies are all greater than or equal to the first latency threshold, the first PE determines that the link between the first PE and the second PE is a high latency link. Specifically, the first PE may send the ETH-LMM to the second PE according to a preset time period. It may be understood that, based on each ETH-LMM sent by the first PE to the second PE, the first PE may determine a corresponding actual latency. Therefore, the first PE may determine the plurality of actual latencies based on the plurality of ETH-LMMs sent to the second PE. In this manner, the following problem may be avoided: The result of determining obtained in block S102 is inaccurate due to the accidental network jitter.

The preset time period and the first quantity are not specifically limited in this embodiment of this application. The preset time period and the first quantity may be preconfigured. A specific value of the preset time period and a specific value of the first quantity may be stored in a storage medium, for example, in a manner of a configuration file. The first PE may read the configuration file from the storage medium, to obtain the preset time period and the first quantity.

For ease of description, in the following description of this embodiment of this application, the "link between the first PE and the second PE" is referred to as a first link.

It may be understood that in actual application, if the first link is a high latency link, it indicates that the first link corresponds to relatively low data transmission efficiency. In this case, in the conventional technology, the network management personnel may generally remove the first link through manual configuration, and the network management personnel further reconfigure a load balancing policy. It can be understood that, because the network management personnel need to perform manual configuration and the manual configuration performed by the network management personnel requires a specific time, the load balancing policy is not adjusted in time in the conventional technology, and therefore, data transmission efficiency cannot be effectively improved.

To resolve this problem, in an implementation of this embodiment of this application, the first PE may automatically adjust the load balancing policy. Specifically, after determining that the first link is a high latency link, the first PE may further send first data to a first CE device through a second link. The first data is data that is expected to be sent to the first CE device through the first link. The second link and the first link are load sharing links for each other. The second link is a link between the first PE and a third PE. In other words, in this embodiment of this application, after determining that the first link is a high latency link, the first PE may start a new load balancing policy, switch, to the second link, the first data that is expected to be sent to the first CE device through the first link, and send the first data to the first CE device. It should be noted that the first data may be understood as data that is originally to be sent to the first CE device through the first link. This embodiment of this application does not specifically limit a specific implementation in which the first PE determines the first data. For example, the first PE may determine the first data based on, for example, a first load balancing policy. The first load balancing policy is a load balancing policy used before the first PE determines that the first link is a high latency link.

With reference to FIG. 1, description is provided by using an example in which the first PE mentioned herein is the PE 101 shown in FIG. 1, the second PE mentioned herein is the PE 103 shown in FIG. 1, and correspondingly, the first link is the link 110 shown in FIG. 1. Before the PE 101 determines that the link 110 is a high latency link, the first load balancing policy used by the PE 101 is evenly allocating data to be sent to the CE 102 to the three links: the link 110, the link 120, and the link 130. Specifically, when receiving a first packet to be sent to the CE 102, the PE 101 sends the packet to the CE 102 through the link 110; when receiving a second packet to be sent to the CE 102, the PE 101 sends the packet to the CE 102 through the link 120; when receiving a third packet to be sent to the CE 102, the PE 101 sends the packet to the CE 102 through the link 130; and so on. After the PE 101 determines that the link 110 is a high latency link, if the PE 101 receives a packet, for example, receives a seventh packet, the PE 101 may determine based on the first load balancing policy that the packet is a packet that is expected to be sent to the CE 102 through the link 110. In this case, the PE 101 adjusts the packet to the link 120 or the link 130 and sends the packet to the CE 102.

In this embodiment of this application, the first PE adjusts the first data to the second link and sends the second data to the first CE device. A specific implementation, the adjusting may be determined based on a quantity of second links serving as load sharing links for the first link. Different quantities of second links serving as load sharing links for the first link correspond to different implementations. The following describes two possible implementations.

In a possible implementation, if there is only one second link serving as the load sharing link for the first link, the first PE may adjust the first data to the second link and send the first data to the first CE device.

Figure 3:
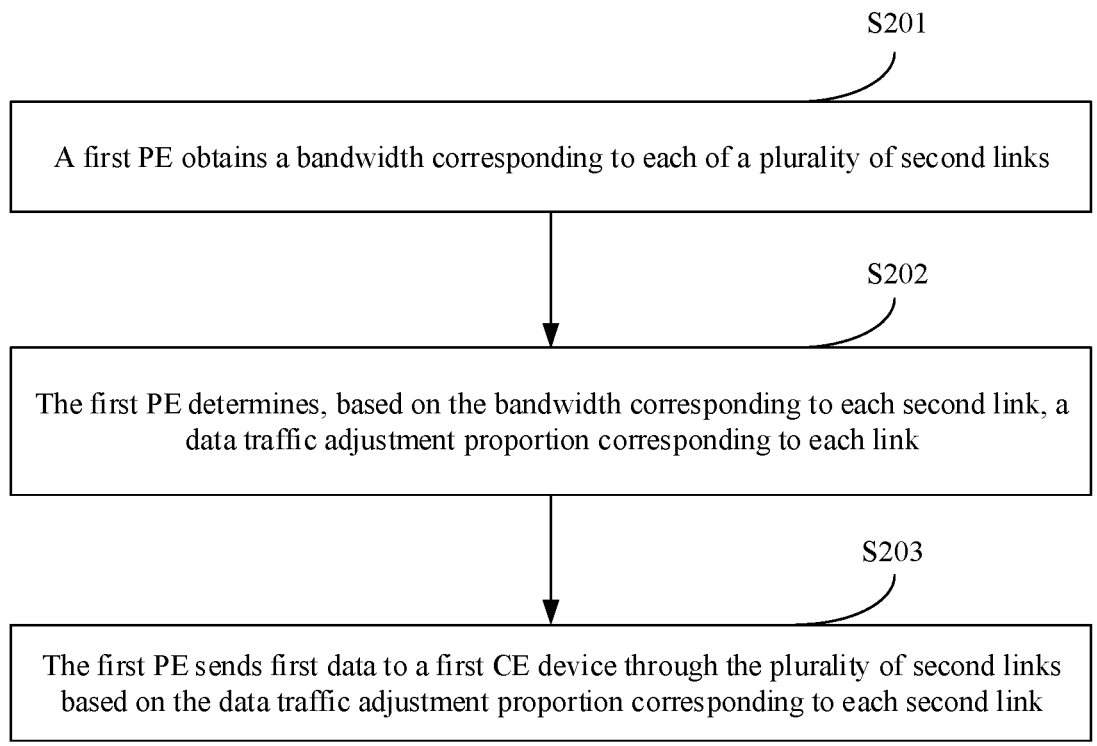
FIG. 3 is a schematic flowchart of a data sending method according to an embodiment of this application.

In still another possible implementation, if there are a plurality of second links serving as load sharing links for the first link, for example, as shown in FIG. 1, the second link serving as a load balancing link for the link 110 includes the link 120 and the link 130. In this case, in this embodiment of this application, to further improve efficiency of sending data by the first PE to the first CE, the first PE may further adjust the first data to the plurality of second links with reference to bandwidths of the plurality of second links and send the first data to the first CE device. In this case, a specific implementation in which the first PE adjusts the first data to the second link and sends the first data to the first CE device may be implemented by performing blocks S201 to S203 shown in FIG. 3. FIG. 3 is a schematic flowchart of a data sending method according to an embodiment of this application.

S201. The first PE obtains a bandwidth corresponding to each of the plurality of second links.

This embodiment of this application does not specifically limit a specific implementation in which the first PE determines the bandwidth of the second link. For example, the first PE may send a bandwidth obtaining request to a controller such as a controller in a network management system, and receive the bandwidth that is of the second link and that is fed back by the controller. For another example, when the network device sends the routing message to the first PE, the routing message may carry the bandwidth corresponding to the link. Therefore, the first PE may parse the routing message, to determine the bandwidth corresponding to the second link.

S202. The first PE determines, based on the bandwidth corresponding to each second link, a data traffic adjustment proportion corresponding to each second link.

S203. The first PE sends the first data to the first CE device through the plurality of second links based on the data traffic adjustment proportion corresponding to each second link.

In this embodiment of this application, the bandwidth of the second link can reflect a data transmission capability of the second link. Generally, a higher bandwidth of the second link indicates a higher data transmission capability of the second link, and correspondingly, a lower bandwidth of the second link indicates a lower data transmission capability of the second link. In consideration of this, in this embodiment of this application, to fully use the data transmission capabilities of the plurality of second links and effectively improve the data transmission efficiency, when the first data is adjusted to the plurality of second links and sent to the first CE device, a data volume adjusted to each second link may be determined based on the data transmission capabilities respectively corresponding to the plurality of second links, so that the data volume adjusted to each second link matches the bandwidth of the second link.

Specifically, the first PE determines, based on the bandwidth corresponding to each second link, the data traffic adjustment proportion corresponding to each second link, then adjusts the first data to the plurality of second links based on the data traffic adjustment proportion corresponding to each second link, and sends the first data to the first CE device.

In a specific implementation of block S202, for example, a total bandwidth of the plurality of second links may be calculated, and then a ratio of the bandwidth of each second link to the total bandwidth is calculated, to obtain the data traffic adjustment proportion corresponding to each second link. For another example, a ratio between the bandwidths of the plurality of second links may be calculated. Further, the data traffic adjustment proportion corresponding to each second link is obtained through calculation based on the ratio.

For block S202 and block S203, with reference to FIG. 1, description is provided by using an example in which the first PE mentioned herein is the PE 101 shown in FIG. 1, the second PE mentioned herein is the PE 103 shown in FIG. 1, and correspondingly, the first link is the link 110 shown in FIG. 1. The second link includes the link 120 and the link 130. The PE 101 determines that a bandwidth of the link 120 is 100 M and determines that a bandwidth of the link 130 is 50 M, that is, a bandwidth ratio of the link 120 to the link 130 is 2:1, to determine that data that is expected to be sent to the CE 101 through the link 110 is adjusted to the link 120 and the link 130 according to the ratio of 2:1 and sent to the CE 101. To be specific, ⅔ of the first data is adjusted to the link 120 and sent to the CE 101, and ⅓ of the first data is adjusted to the link 130 and sent to the CE 101.

It may be understood that, in actual application, if the second link is a high latency link, efficiency of adjusting the first data to the second link and sending the first data to the first CE device may not be effectively improved. In consideration of this, to ensure the efficiency of adjusting the first data to the second link and sending the first data to the first CE device, in a possible implementation of this embodiment of this application, the second link may be a non-high latency link. Specifically, in this embodiment of this application, a routing message that is sent by the network device such as the third PE to the first PE and that indicates that the third PE is a next hop of the first PE may also carry a latency upper limit corresponding to the second link. In this way, the first PE may determine based on the latency upper limit corresponding to the second link and an actual latency on the second link whether the second link is a high latency link. A specific implementation in which the first PE determines based on the latency upper limit corresponding to the second link and the actual latency on the second link whether the second link is a high latency link has the same principle as an implementation in which the first PE determines whether the first link is a high latency link. Details are not described herein again.

As described above, the routing message sent by the network device to the first PE may pass through a plurality of other nodes. These nodes may perform corresponding processing on the routing message in a process of forwarding the routing message. It may be understood that these nodes may add another latency lower limit to the routing message. In other words, the routing message received by the first PE may include a plurality of latency lower limits. In this case, the first PE may determine one latency lower limit as the second latency threshold from the plurality of latency lower limits. For example, the first PE may determine a minimum value of the plurality of latency upper limits as the second latency threshold.

In actual application, a link latency is an important indicator for indicating data transmission efficiency on a link. In consideration of this, to further evaluate the data transmission efficiency on the link, in an implementation of this embodiment of this application, the routing message sent by the network device to the first PE may further carry the second latency threshold. The second latency threshold is used to indicate the latency lower limit corresponding to the first link. The second latency threshold is less than the first latency threshold. Similar to the first latency threshold, the second latency threshold may also be carried in the extended community attribute of the routing message. When the routing message is an EVI-AD routing message and the EVI-AD routing message further carries the identifier of the EVPN instance, the second latency threshold is a latency lower limit corresponding to the first link corresponding to the EVPN instance.

After receiving the routing message, the first PE may further obtain the second latency threshold in addition to the first latency threshold based on the routing message. Further, the first PE may further compare the actual latency on the first link with the second latency threshold. When the actual latency is less than or equal to the second latency threshold, it indicates that the actual latency on the first link is lower than the latency lower limit corresponding to the first link. In this case, the first PE may determine that the first link is a low latency link, that is, may determine that data transmission efficiency on the first link is high.

Similarly, the first PE device may continuously determine a plurality of actual latencies, for example, a first quantity of actual latencies, and determine that the first link is a low latency link when the plurality of actual latencies are all less than or equal to the second latency threshold. Therefore, the following problem is avoided: The actual latency is inaccurately determined in a single time, and therefore, the result of determining based on the actual latency in the single time whether the first link is a low latency link is inaccurate.

It may be understood that the first link is a low latency link. To some extent, it may indicate relatively high data transmission efficiency on the first link. In this case, to improve efficiency of sending data to the first CE device, in an implementation of this embodiment of this application, the first PE may further adjust second data to the first link and send the second data to the first CE device. The second data is data that is expected to be sent to the first CE device through a third link. The third link and the first link are load sharing links for each other. The third link may be considered as a link between the first PE and a fourth PE. In other words, in this embodiment of this application, after determining that the first link is a low latency link, the first PE may start a new load balancing policy, switch, to the first link, the second data that is expected to be sent to the first CE device through the third link, and send the first data to the first CE device. It should be noted that the second data may be understood as all or a part of data that is originally to be sent to the first CE device through the third link. This embodiment of this application does not specifically limit a specific implementation in which the first PE determines the second data. For example, the first PE may determine the second data based on a second load balancing policy. The second load balancing policy is a load balancing policy used before the first PE determines that the first link is a low latency link.

It may be understood that, by using the solution in this embodiment of this application, if the first PE determines at a first moment that the first link is a high latency link, the first PE no longer uses the first link to send data to the first CE device. If the first PE determines at a second moment after the first moment that the first link is a low latency link, the first PE may continue to send data to the first CE device through the first link, so that a data transmission policy corresponding to the first link is dynamically adjusted based on data transmission performance on the first link, thereby fully utilizing the data transmission performance on the first link and maximizing efficiency of sending data to the first CE device.

Based on the high latency link determining method provided in the foregoing embodiment, an embodiment of this application further provides a high latency link determining apparatus. The apparatus is configured to perform steps performed by the first PE mentioned in the foregoing embodiment, for example, blocks S101 and S102 and blocks S201 to S203. Correspondingly, an embodiment of this application also provides a routing advertisement apparatus. The following describes the high latency link determining apparatus and the routing advertisement apparatus with reference to the accompanying drawings.

Figure 4:
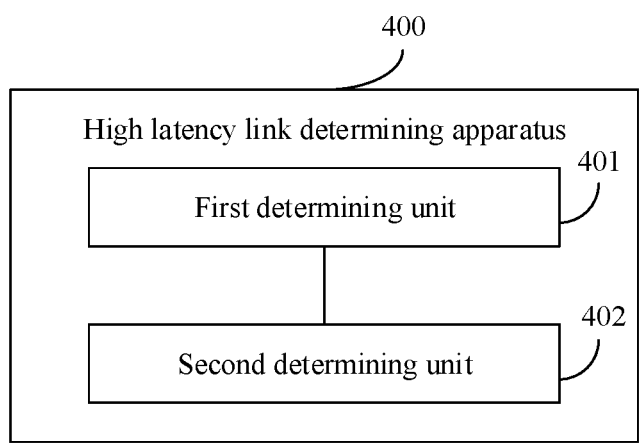
FIG. 4 is a schematic diagram of a structure of a high latency link determining apparatus according to an embodiment of this application.

FIG. 4 is a schematic diagram of a structure of a high latency link determining apparatus according to an embodiment of this application. A high latency link determining apparatus 400 shown in FIG. 4 may specifically include, for example, a first determining unit 401 and a second determining unit 402.

The first determining unit 401 is configured to determine an actual latency corresponding to a link between a first provider edge PE device and a second PE. The second PE is a next hop of the first PE.

The second determining unit 402 is configured to: when the actual latency is greater than or equal to a first latency threshold, determine that the link between the first PE and the second PE is a high latency link. The first latency threshold is used to indicate a latency upper limit corresponding to the link between the first PE and the second PE.

In an implementation, the first latency threshold is obtained from a received Ethernet virtual instance auto discovery EVI-AD routing message.

In an implementation, the EVI-AD routing message further includes an identifier of an Ethernet virtual private network EVPN instance. The link between the first PE and the second PE corresponds to the EVPN instance.

In an implementation, the EVI-AD routing message further includes a second latency threshold. The second latency threshold is used to indicate a latency lower limit corresponding to the link between the first PE and the second PE.

In an implementation, the second determining unit is specifically configured to:

when a plurality of actual latencies continuously determined by the first PE are all greater than or equal to the first latency threshold, determine that the link between the first PE and the second PE is a high latency link.

In an implementation, the apparatus further includes:

a first sending unit, configured to send first data to a first customer edge CE device through a second link, where the first data is data that is expected to be sent to the first CE device through a first link, the second link and the first link are load sharing links for each other, and the first link is the link between the first PE and the second PE.

In an implementation, the first sending unit is specifically configured to:

obtain a bandwidth corresponding to each of a plurality of second links;

determine, based on the bandwidth corresponding to each second link, a data traffic adjustment proportion corresponding to each second link; and send the first data to the first CE device through the plurality of second links based on the data traffic adjustment proportion corresponding to each second link.

In an implementation, the first sending unit is specifically configured to:

send the first data to the first CE device through one second link.

In an implementation, the second link is a non-high latency link.

In an implementation, the apparatus further includes a third determining unit, configured to: when the actual latency is less than or equal to the second latency threshold, determine that the link between the first PE and the second PE is a low latency link.

In an implementation, the third determining unit is specifically configured to:

when the plurality of actual latencies continuously determined by the first PE are all less than or equal to the second latency threshold, determine that the link between the first PE and the second PE is a low latency link.

In an implementation, the apparatus further includes:

a second sending unit, configured to send second data to the first CE device through the first link, where the second data is data that is expected to be sent to the first CE device through a third link, the third link and the first link are load sharing links for each other, and the first link is the link between the first PE and the second PE.

Because the apparatus 400 is an apparatus corresponding to the high latency link determining method provided in the foregoing method embodiment, a specific implementation of each unit in the apparatus 400 has a same concept as that in the foregoing method embodiment. Therefore, for the specific implementation of each unit in the apparatus 400, refer to a related description part in the foregoing method embodiment. Details are not described herein again.

Figure 5:
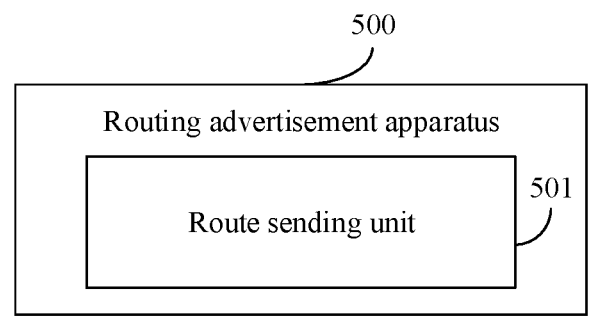
FIG. 5 is a schematic diagram of a structure of a routing advertisement apparatus according to an embodiment of this application.

FIG. 5 is a schematic diagram of a structure of a routing advertisement apparatus according to an embodiment of this application. A routing advertisement apparatus 500 shown in FIG. 5 may include, for example, a route sending unit 501.

The route sending unit 501 is configured to send a routing message to a first provider edge PE device. The routing message includes a first latency threshold. The first latency threshold is used to indicate a latency upper limit corresponding to a link between the first PE and a second PE. The second PE is a next hop of the first PE.

In an implementation, the routing message further includes a second latency threshold. The second latency threshold is used to indicate a latency lower limit corresponding to the link between the first PE and the second PE.

In an implementation, the routing message is an Ethernet virtual instance auto discovery EVI-AD routing message.

In an implementation, the EVI-AD routing message further includes an identifier of an Ethernet virtual private network EVPN instance. The link between the first PE and the second PE corresponds to the EVPN instance.

In an implementation, the EVI-AD routing message includes an extended community field. The extended community field includes the first latency threshold.

In an implementation, the EVI-AD routing message includes an extended community field. The extended community field includes the second latency threshold.

Because the apparatus 500 is an apparatus corresponding to the routing advertisement method that is performed by the network device and that is provided in the foregoing method embodiment, a specific implementation of each unit in the apparatus 500 has a same concept as that in the foregoing method embodiment. Therefore, for the specific implementation of each unit in the apparatus 500, refer to a related description part in the foregoing method embodiment. Details are not described herein again.

An embodiment of this application further provides a high latency link determining device. The device includes a processor and a memory. The memory is configured to store a program. The processor is configured to execute the program in the memory, to perform the high latency link determining method that is performed by the first PE and that is provided in the foregoing method embodiment. In some embodiments, the high latency link determining device may be any PE in FIG. 1.

An embodiment of this application further provides a routing advertisement device. The device includes a processor and a memory. The memory is configured to store a program. The processor is configured to execute the program in the memory, to perform the routing advertisement that is performed by the network device and that is provided in the foregoing method embodiment. In some embodiments, the routing advertisement device may be any PE in FIG. 1, or the routing advertisement device may be a controller, and the controller is configured to control a route between PEs in FIG. 1.

Figure 6:
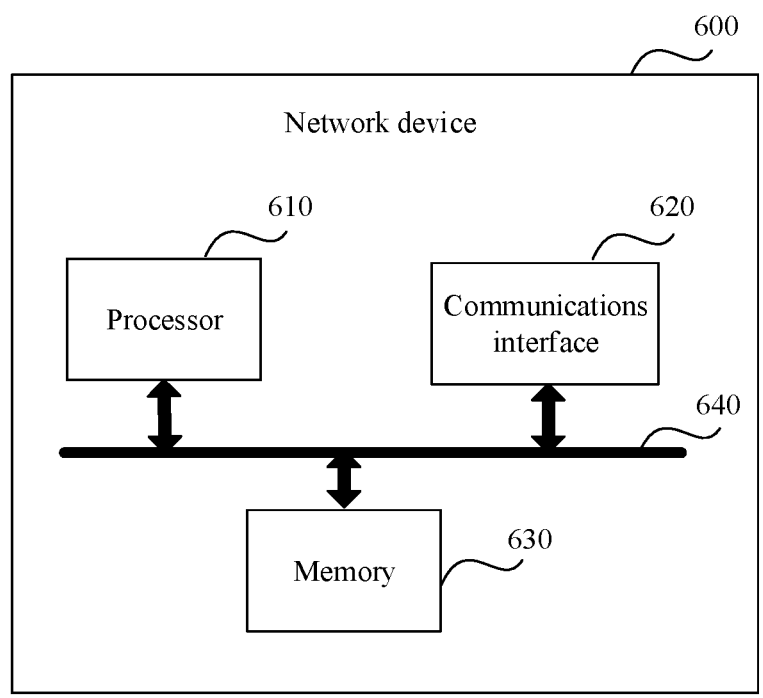
FIG. 6 is a schematic diagram of a structure of a network device according to an embodiment of this application.

It should be noted that hardware structures of the foregoing high latency link determining device and the foregoing routing advertisement device may be structures shown in FIG. 6. FIG. 6 is a schematic diagram of a structure of a network device according to an embodiment of this application.

With reference to FIG. 6, a network device 600 includes a processor 610, a communications interface 620, and a memory 630. There may be one or more processors 610 in the network device 600, and one processor is used as an example in FIG. 6. In this embodiment of this application, the processor 610, the communications interface 620, and the memory 630 may be connected through a bus system or in another manner. In FIG. 6, for example, a bus system 640 is used for connection.

The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 630 may include a volatile memory, for example, a random-access memory (r RAM). The memory 630 may alternatively include a non-volatile memory (English: non-volatile memory), for example, a flash memory, a hard disk drive (HDD), or a solid-state drive (SSD). The memory 630 may alternatively include a combination of the foregoing types of memories.

If the network device 600 is the high latency link determining device mentioned in the foregoing embodiment, the memory 630 may store the first latency threshold, the second latency threshold, and the like mentioned in the foregoing embodiment. If the network device 600 is the routing advertisement device mentioned in the foregoing embodiment, the memory 630 may store the EVI-AD routing message and the like mentioned in the foregoing embodiment.

Optionally, the memory 630 stores an operating system and a program, an executable module or a data structure, or a subset thereof, or an extended set thereof. The program may include various operation instructions, to implement various operations. The operating system may include various system programs, to implement various basic services and process hardware-based tasks. The processor 610 may read the program in the memory 630, to implement the high latency link determining method provided in the embodiments of this application.

The bus system 640 may be a peripheral component interconnect (PCI) bus, an extended industry standard architecture (EISA) bus, or the like. The bus system 640 may be classified into an address bus, a data bus, a control bus, and the like. For ease of representation, only one thick line is used to represent the bus in FIG. 6, but this does not mean that there is only one bus or only one type of bus.

An embodiment of this application further provides a computer-readable storage medium, including instructions. When the instructions are run on a computer, the computer is enabled to perform the high latency link determining method that is performed by the first PE and that is provided in the foregoing embodiment.

An embodiment of this application further provides a computer-readable storage medium, including instructions. When the instructions are run on a computer, the computer is enabled to perform the routing advertisement that is performed by the network device and that is provided in the foregoing embodiment.

An embodiment of this application further provides a computer program product including instructions. When the computer program product runs on a computer, the computer is enabled to perform the high latency link determining method that is performed by the first PE and that is provided in the foregoing embodiment.

An embodiment of this application further provides a computer program product including instructions. When the computer program product runs on a computer, the computer is enabled to perform the routing advertisement that is performed by the network device and that is provided in the foregoing embodiment.

In the specification, the claims, and the accompanying drawings of this application, terms such as "first", "second", "third", and "fourth" (if existent) are intended to distinguish between similar objects but do not necessarily indicate a specific order or sequence. It should be understood that the data termed in such a way is interchangeable in proper circumstances so that the embodiments described herein can be implemented in orders other than the order illustrated or described herein. Moreover, the terms "include", "contain" and any other variants mean to cover non-exclusive inclusions. For example, a process, method, system, product, or device that includes a list of steps or units is not necessarily limited to those expressly listed steps or units, but may include other steps or units that are not expressly listed or inherent to the process, method, product, or device.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical service division and may be another division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or another form.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solutions of this application essentially, or a part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in the embodiments of this application. The storage medium includes any medium that can store program code, such as a USB flash drive, a removable hard disk, a read-only memory (ROM), a random access memory (RAM), a magnetic disk, or an optical disc.

The person skilled in the art should be aware that in the foregoing one or more examples, the services described in the present application may be implemented by using hardware, software, firmware, or any combination thereof. When the present application is implemented by using the software, the services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a general-purpose or dedicated computer.

The objectives, technical solutions, and beneficial effects of the present application have been described in further detail in the foregoing specific implementations. It should be understood that the foregoing descriptions are merely specific implementations of the present application.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to a part of technical features thereof. These modifications or replacements do not make the essence of the corresponding technical solutions depart from the scope of the technical solutions in the embodiments of this application.

What is claimed is:

1. A method performed by a first provider edge (PE) device, comprising:
   determining an actual latency corresponding to a link between the first PE device and a second PE device, wherein the second PE device is a next hop of the first PE device; and
   when the actual latency is greater than or equal to a first latency threshold, determining that the link is a high latency link, wherein the first latency threshold is used to indicate a latency upper limit corresponding to the link,
   wherein the first latency threshold is involved with a received routing message,
   where the received routing message comprises a community field carrying the first latency threshold.

2. The method according to claim 1, further comprising: when a plurality of actual latencies continuously are all greater than or equal to the first latency threshold, determining that the link is a high latency link.

3. The method according to claim 1, further comprising:
   sending first data to a first customer edge (CE) device through a second link, wherein the first data is data that is expected to be sent to the first CE device through a first link, wherein the second link and the first link are load sharing links for each other, and wherein the first link is the link between the first PE device and the second PE device.

4. The method according to claim 3, further comprising:
   obtaining a bandwidth corresponding to each of a plurality of second links;
   determining, based on the bandwidth corresponding to each second link, a data traffic adjustment proportion corresponding to each second link; and
   sending the first data to the first CE device through the plurality of second links based on the data traffic adjustment proportion corresponding to each second link.

5. The method according to claim 3, further comprising:
   sending the first data to the first CE device through one second link.

6. The method according to claim 3, wherein the second link is a non-high latency link.

7. The method according to claim 1, further comprising:
   when the actual latency is less than or equal to a second latency threshold, determining that the link is a low latency link, wherein the second latency threshold is used to indicate the latency lower limit corresponding to the link between the first PE device and the second PE device.

8. The method according to claim 7, further comprising:
   when the plurality of actual latencies continuously are all less than or equal to the second latency threshold, determining that the link is a low latency link.

9. The method according to claim 7, further comprising:
   sending second data to the first CE device through the first link, wherein the second data is data that is expected to be sent to the first CE device through a third link,
   wherein the third link and the first link are load sharing links for each other, and
   wherein the first link is the link between the first PE device and the second PE device.

10. The method according to claim 1, where the received routing message is an Ethernet virtual instance auto discovery (EVI-AD) routing message.

11. The method according to claim 10, wherein the EVI-AD routing message comprises an identifier of an Ethernet virtual private network (EVPN) instance, and
    wherein the link corresponds to the EVPN instance.

12. The method according to claim 10, wherein the EVI-AD routing message comprises a second latency threshold, and
    wherein the second latency threshold is used to indicate a latency lower limit corresponding to the link.

13. An apparatus, comprising a processor, wherein the processor configures the apparatus to:
    determine an actual latency corresponding to a link between a first provider edge (PE) device and a second PE device, wherein the second PE device is a next hop of the first PE device; and
    when the actual latency is greater than or equal to a first latency threshold, determine that the link is a high latency link, wherein the first latency threshold is used to indicate a latency upper limit corresponding to the link,
    wherein the first latency threshold is involved with a received routing message,
    where the received routing message comprises a community field carrying the first latency threshold.

14. The apparatus according to claim 13, where the processor further configures the apparatus to: send first data to a first customer edge (CE) device through a second link, wherein the first data is data that is expected to be sent to the first CE device through a first link,
    wherein the second link and the first link are load sharing links for each other, and
    wherein the first link is the link between the first PE device and the second PE device.

15. The apparatus according to claim 13, where the received routing message is an Ethernet virtual instance auto discovery (EVI-AD) routing message.

16. The apparatus according to claim 15, wherein the EVI-AD routing message further comprises an identifier of an Ethernet virtual private network (EVPN) instance, and
    wherein the link corresponds to the EVPN instance.

17. The apparatus according to claim 15, wherein the EVI-AD routing message further comprises a second latency threshold, and
    wherein the second latency threshold is used to indicate a latency lower limit corresponding to the link.

18. A non-transitory computer-readable media storing instructions that when executed by a computer configure the computer to perform steps comprising:
    determining an actual latency corresponding to a link between a first provider edge (PE) device and a second PE device, wherein the second PE device is a next hop of the first PE device; and
    when the actual latency is greater than or equal to a first latency threshold, determining that the link is a high latency link, wherein the first latency threshold is used to indicate a latency upper limit corresponding to the link, wherein the first latency threshold is involved with a received routing message, where the received routing message comprises a community field carrying the first latency threshold.

19. The computer program product according to claim 18, where the received routing message is an Ethernet virtual instance auto discovery (EVI-AD) routing message.

20. The computer program product according to claim 19, wherein the EVI-AD routing message further comprises an identifier of an Ethernet virtual private network (EVPN) instance, and wherein the link corresponds to the EVPN instance.

* * * * *